B. MONTGOMERY.
FISH SCALER.
APPLICATION FILED FEB. 2, 1918. RENEWED DEC. 23, 1918.
1,294,140.
Patented Feb. 11, 1919.
2 SHEETS—SHEET 1.
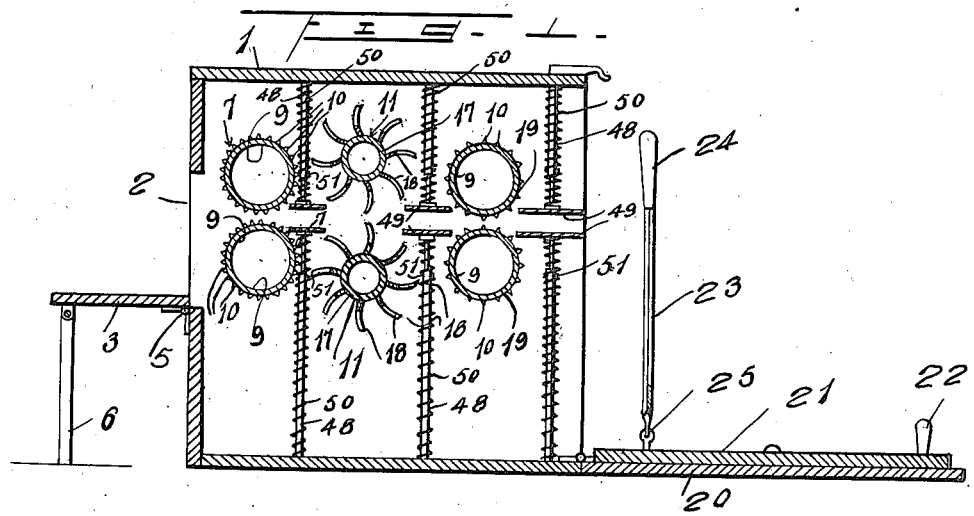
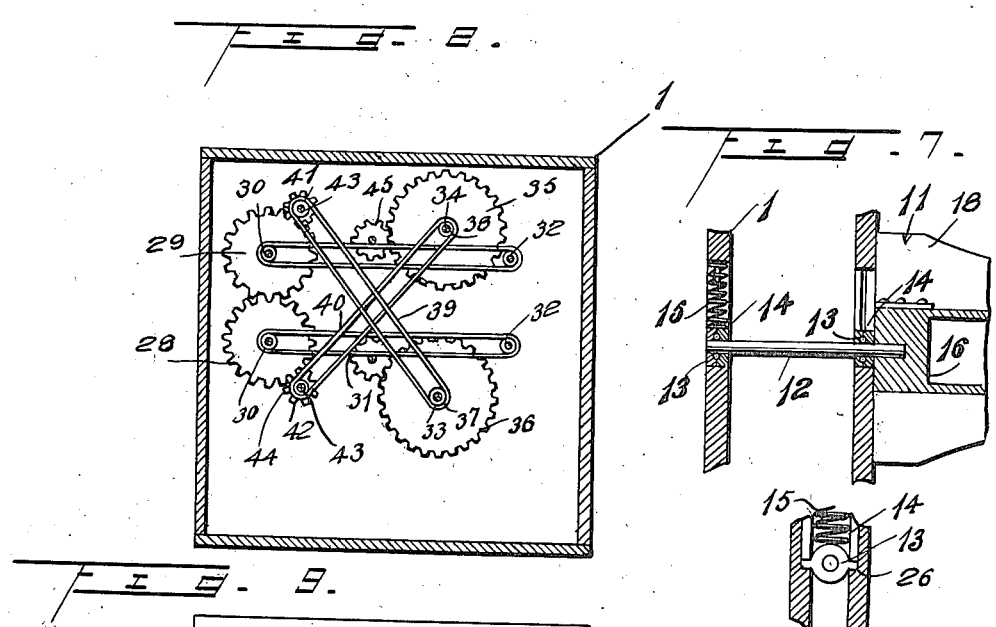

B. MONTGOMERY.
FISH SCALER.
APPLICATION FILED FEB. 2, 1918. RENEWED DEC. 23, 1918.
1,294,140.
Patented Feb. 11, 1919.
2 SHEETS—SHEET 2.
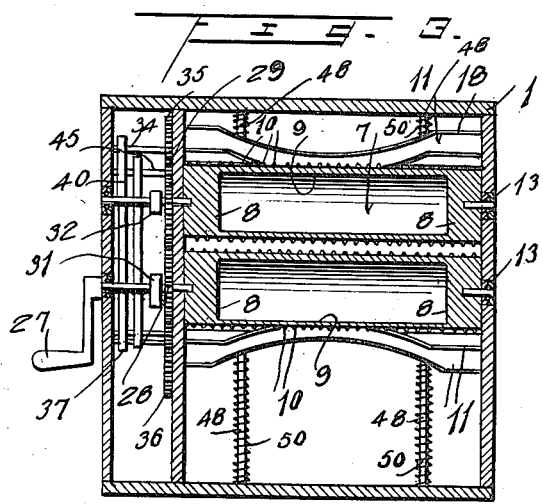
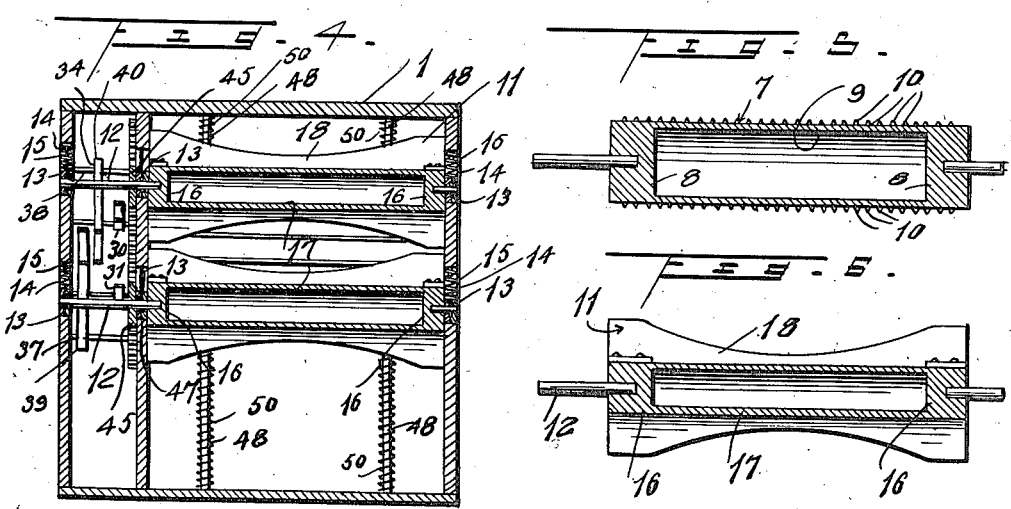

UNITED STATES PATENT OFFICE.

BISHOP MONTGOMERY, OF CASTLEBERRY, ALABAMA.

FISH-SCALER.

1,294,140. Specification of Letters Patent. Patented Feb. 11, 1919.

Application filed February 2, 1918, Serial No. 215,093. Renewed December 23, 1918. Serial No. 268,059.

*To all whom it may concern:*

Be it known that I, BISHOP MONTGOMERY, a citizen of the United States, residing at Castleberry, in the county of Conecuh and State of Alabama, have invented certain new and useful Improvements in Fish-Scalers; and I do hereby declare the following to be a full, clear, and exact description of the invention, such as will enable others skilled in the art to which it appertains to make and use the same.

This invention relates to improvements in fish scalers and more particularly to a machine especially adapted to remove the scales from fish fed therein, thus obviating the old process of scaling fish by hand.

Another object of this invention is the provision of a pair of scaling rollers or members adapted to remove the scales from fish as they pass therebetween.

A further object of this invention is the provision of means for feeding the fish to the scaling rollers or members.

A further object of this invention is the provision of means for receiving the fish after they have been scaled and whereby they may be sliced or cut in sections.

A still further object of this invention is the provision of a fish scaler of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a vertical sectional view of a fish scaler constructed in accordance with my invention, Fig. 2 is a similar view illustrating the manner of driving the feed rollers and scaling rollers, Fig. 3 is a transverse sectional view illustrating the feed rollers, Fig. 4 is a similar view illustrating the scaling rollers, Fig. 5 is a longitudinal sectional view of one of the feed rollers, Fig. 6 is a similar view of one of the scaling rollers, Fig. 7 is a fragmentary sectional view illustrating means for permitting the scaling rollers to move with relation to each other to accommodate fish of several sizes, Fig. 8 is a detail sectional view of a bearing, Fig. 9 is a fragmentary plan view of the receiving table.

Referring in detail to the drawings, the numeral 1 indicates a casing having an opening 2 in the front wall thereof, under which is disposed a table or support 3. The table or support 3 is hinged to the front wall of the casing 1 by means of a hinge 5 and has its free end supported by a leg 6. The support or table 3 is adapted to receive the fish prior to being scaled. A pair of relatively spaced feed rollers 7 are journaled in suitable bearings carried by the walls of the casing and are located in close proximity to the opening 2 in the front wall. Each of the feed rollers consist of spaced cylindrical members 8 which have secured thereto stub shafts that are received within the bearings on the walls of the casing 1 and the members 8 have secured upon the peripheries a cylindrical member 9 constructed from rubber or other material suitable for the purpose so as to form a roller in which its intermediate portion is capable of flexibility. The rollers 7 have formed upon their peripheries thereof a plurality of teeth 10 for the purpose of biting into a fish when fed between the rollers. By having the rollers constructed from rubber or other suitable material that is capable of yielding provides a construction wherein fish of several sizes can be readily fed between the rollers 7.

A pair of scaling rollers or members 11 are associated with the feed rollers 7 as clearly illustrated in Fig. 1 and the shafts 12 thereof are journaled in suitable roller bearings 13 that are slidably mounted within slots 14 in the walls of the casing 1. The scaling rollers or members 11 are normally moved in the direction of each other under the influence of springs 15 that bear against the bearings 13 as clearly illustrated in Fig. 7. Each of the scaling rollers or members 11 consists of end cylindrical members 16 to which is secured a cylindrical member 17 constructed of rubber or other material suitable for the purpose so as to render elasticity to the scaling rollers or members. The cylindrical member 17 has secured to the periphery thereof a plurality of spaced scraping members 18 that may be constructed from any material suitable for the purpose. These members 18 are curved from their ends to a point intermediate their ends so that they will remove scales from fish of several sizes. The scaling rollers or members 11 are so located within the casing in relation to each other, that they will readily remove the scales from the fish received from the feed rollers 7 without cutting or injuring the fish. The members 18 are also slightly curved as illustrated in Fig. 1 so that they may have a scraping action when rotated.

A pair of rollers 19 similar in construction to the feed rollers 7 are located in close proximity to the scraping rollers which are adapted to receive the fish after they are scaled to feed them outwardly of the casing 1 through the rear wall thereof which is open and is adapted to have associated therewith a receiving table 20 on which is pivoted a turn table 21. The turn table 21 has secured thereto a suitable handle 22 for the purpose of turning the same in relation to the receiving table 20 so as to change the position of the fish in relation to the casing without handling the same.

A suitable knife 23 provided with a handle 24 is secured to the turn table by a universal joint 25 and is adapted to slice or cut the fish into sections upon the turn table. By securing the knife 23 to the turn table 21 by means of the universal joint 25 permits the knife to be used at various angles and also provides a construction wherein the knife may be positioned flatly upon the turn table when not in use. The bearings 13 which support the shaft of the scaling rollers or members 11, are each provided with oppositely disposed ears or lugs 26 which slide within grooves in the walls of the slots 14 so that the bearings are capable of sliding movement to adjust the scaling rollers or members in relation to each other but will be prevented from lateral movement in relation to the casing. One of the shafts which supports one of the feed rollers 7 extends through the wall of the casing 1 and has secured thereto a suitable crank handle 27 for the purpose of rotating the same. A gear 28 is secured to the last named shaft and meshes with a gear 29 carried by the shaft of the feed roller whereby upon rotation of the crank handle 27 the feed rollers will be rotated so that upon feeding a fish thereto it will be fed to the scaling rollers or members 18. Pulleys 30 are secured to the shafts that support the feed rollers 7 and have mounted thereon endless belts 31 that travel over pulleys 32, carried by the shafts that support the rollers 19 whence the rollers 19 are driven in a corresponding direction with the feed rollers 7. Stubs shafts 33 and 34 are journaled in the casing 1 and have secured thereon gears 35 and 36 and also pulleys 37 and 38 which have mounted thereon endless belts 39 and 40. The endless belts 39 and 40 pass over the pulleys 41 and 42. The pulleys 41 and 42 are carried by shafts 43 that have secured thereon pinions 44 that mesh with the gears 28 and 29 whereby upon rotation of the gears 28 and 29 the gears 35 and 36 are driven which in turn rotate the pinions 45 secured to the shafts of the scaling rollers or members 11 and which will drive said scaling rollers or members 18 at an increased rate of speed over that of the feeding rollers.

A plurality of telescopic members 48 are secured to the top and bottom walls of the casing 1 and have secured thereto guide members 49 which are disposed between the feed and scaling rollers for the purpose of supporting the fish when passing from one to another. The guide members are normally urged in the direction of each other by springs 50 and which are limited in their movement by pins 51. By having the guide members so mounted they will permit fish of different sizes to pass therebetween.

When not desiring to use the machine or device, the tables 3 and 20 may be folded upwardly to close the openings in the casing which will completely house the various parts and provide a construction which can be readily and conveniently conveyed from one point to another. A suitable wall or partition 47 is located within the casing and is provided with spaced openings to receive the various shafts of the feed rollers, scaling rollers or members, and the rollers 19 to prevent the gears for operating them from becoming clogged or choked with the scales of the fish during the operation of the machine.

While I have shown and described the preferred embodiment of my invention, it will be understood that minor changes in construction, combination, and arrangement of parts, may be made without departing from the spirit and scope of the invention as claimed.

Having thus described my invention, what I claim is:

1. A fish scaler comprising a casing, scaling rollers journaled in said casing, feed rollers journaled in said casing and adapted to feed fish to the scaling rollers, means rotating the feed rollers, means driving the scaling rollers from the feed rollers at a higher rate of speed than that of the feeding rollers, and means receiving the fish from the scaling rollers after being scaled.

2. A fish scaler comprising a casing, feed rollers journaled in said casing, rollers associated with the feed rollers and constructed of rubber, scraping blades carried by the last named rollers and adapted to remove the scales from fish, and means receiving the fish after being scaled.

3. A fish scaler comprising a casing, elastic scaling rollers journaled in said casing, elastic feed rollers journaled in said casing for feeding fish to the scaling rollers, and means receiving the scaled fish.

4. A fish scaler comprising a casing, hollow elastic rollers journaled in said casing, scaling knives secured to said rollers, feed rollers journaled in said casing, and means receiving the scaled fish from the first-named rollers.

5. A fish scaler comprising a casing, elastic rollers journaled in said casing one above the other, knives secured to said rollers, and means for permitting the rollers to move toward and from each other.

6. A fish scaler comprising a casing, hollow elastic rollers journaled in said casing, knives secured to said rollers and spaced from their ends to a point intermediate their ends, and means feeding fish to said rollers.

7. A fish scaler comprising a casing, a pair of scaling rollers journaled in said casing, a pair of feed rollers journaled in said casing, a pair of receiving rollers journaled in said casing, and means guiding fish from one pair of rollers to the other pair of rollers.

8. A fish scaler comprising a casing, a pair of scaling rollers journaled in said casing, a pair of feed rollers journaled in said casing, a pair of receiving rollers journaled in said casing, and movable guiding means disposed between the pairs of rollers.

9. A fish scaler comprising a casing, a pair of scaling rollers journaled in said casing, a pair of feed rollers journaled in said casing, a pair of receiving rollers journaled in said casing, and pairs of movable guiding means disposed between the pairs of rollers.

In testimony whereof I affix my signature in presence of two witnesses.

BISHOP MONTGOMERY.

Witnesses:
C. S. RABB,
A. H. MASON.